United States Patent [19]

Kerslake

[11] Patent Number: 4,634,564

[45] Date of Patent: Jan. 6, 1987

[54] MANUFACTURE OF MULTI-COLORED DETERGENT BARS

[75] Inventor: Andrew J. Kerslake, Merseyside, England

[73] Assignee: Lever Brothers Company, New York, N.Y.

[21] Appl. No.: 659,140

[22] Filed: Oct. 9, 1984

[30] Foreign Application Priority Data

Oct. 14, 1983 [GB] United Kingdom ................. 8327616

[51] Int. Cl.⁴ .......................... C11D 13/18; B29B 9/16

[52] U.S. Cl. ....................................... 264/75; 264/148; 264/320; 252/134; 425/131.1; 425/132

[58] Field of Search ................. 264/171, 75, 349, 148, 264/320; 425/131.1, 132; 252/134

[56] References Cited

U.S. PATENT DOCUMENTS

| | | | |
|---|---|---|---|
| 3,497,912 | 3/1970 | Fischer | 425/204 |
| 3,673,294 | 6/1972 | Matthaei | 264/75 |
| 3,769,225 | 10/1973 | Matthaei | 264/75 |
| 3,832,431 | 8/1974 | Matthaei | 264/75 |
| 3,891,365 | 6/1975 | Fischer | 425/131.1 |
| 3,993,722 | 11/1976 | Borcher et al. | 264/75 |
| 4,077,753 | 3/1978 | Tanaka | 264/75 |
| 4,077,754 | 3/1978 | Borcher et al. | 425/311 |
| 4,092,388 | 5/1978 | Lewis | 264/75 |
| 4,141,947 | 2/1979 | Fischer et al. | 264/75 |
| 4,156,707 | 5/1979 | Joshi | 264/75 |
| 4,164,385 | 8/1979 | Finkensiep | 264/75 |
| 4,222,979 | 9/1980 | Hunt et al. | 264/75 |
| 4,310,479 | 1/1982 | Ooms et al. | 264/75 |

FOREIGN PATENT DOCUMENTS

| | | |
|---|---|---|
| 854141 | 10/1958 | Italy . |
| 1316477 | 5/1973 | United Kingdom . |
| 1437322 | 5/1976 | United Kingdom . |
| 1528081 | 10/1978 | United Kingdom . |

*Primary Examiner*—Jeffery Thurlow

*Attorney, Agent, or Firm*—Milton L. Honig; James J. Farrell

[57] ABSTRACT

Multi-colored detergent bars are manufactured by adding a visually distinct liquid to one part of the detergent feedstock before it enters the refiner stage.

3 Claims, 3 Drawing Figures

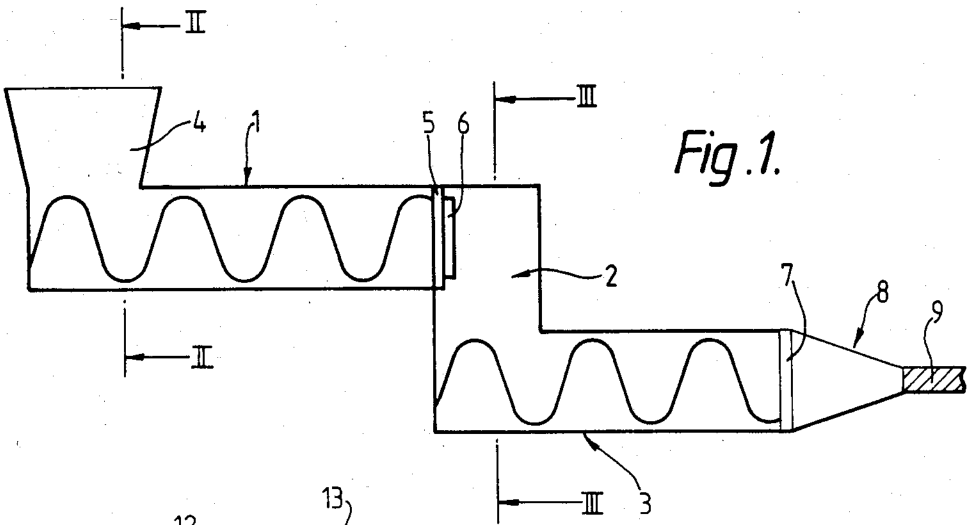
Fig.1.
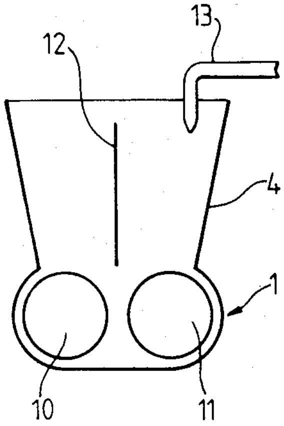
Fig.2.
Fig.3.
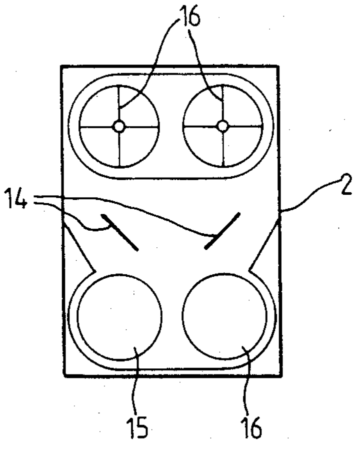

MANUFACTURE OF MULTI-COLORED DETERGENT BARS

FIELD OF THE INVENTION

This invention relates to processes of manufacturing multi-coloured detergent bars in which detergent noodle streams differing in visual appearance are mixed and plodded.

BACKGROUND

A number of processes for manufacturing multi-coloured detergent bars have been commercially used and are well characterised in literature.

In one process streams of detergent noodles of differing visual appearance are mixed prior to the final plodder stage and the mixed mass is extruded, cut and stamped to form bars. The product has a multi-coloured appearance throughout consisting of striations parallel to the axis of extrusion. At the stamping stage the bar may be stamped perpendicular to the axis of extrusion, as is normal in soap processing, or the bar may be stamped at an angle to the axis or the cut billet may be stamped end on i.e., along the axis of extrusion.

The final stages of detergent bar manufacture will normally comprise a refiner stage leading into a plodder stage connected, preferably, by a vacuum chamber. The detergent feedstock is subjected to shearing and mixing action while progressing through the refiner plodder and noodles of detergent are formed by forcing the detergent mass through a multi-apertured plate against which, preferably, a rotating knife cuts the extrudate into consistent sized noodles. The present invention is specific to the processing arrangement in which a refiner stage precedes the plodder stage.

SUMMARY OF INVENTION

In the present invention the streams of detergent noodles are generated from a single detergent feedstock by adding a visually distinct liquid, which is miscible with the detergent base, to at least a part of the feedstock before it passes through the refiner stage. This method allows two streams of noodles to be generated from a single feedstock with each stream being subjected to substantially equal working at the refiner stage. There is a definite advantage in being able to utilise a single feedstock supply because only a single detergent feedstock line, which comprises mixing and milling stages, is necessary prior to the refiner stage. The application of substantially equal working to streams of noodles assists in providing consistent properties between the streams in the plodder stage. This consistency in properties assists the adhesion of the noodles in the plodder and thus the properties of the product bar. The process is capable of accepting a degree of re-work material obtained from the stamping station.

When the refiner stage comprises a parallel twin barrel arrangement the liquid is added to the part of the feedstock fed to one refiner df the twin arrangement. The process may also be operated by adding a visually distinct liquid to each part of the feedstock supplied to the twin barrels; thus both feedstocks may each be mixed with a different liquid dye. Normally twin refiners are fed from a single hopper, but for operation of the present invention the common hopper will require a partition of some form to allow liquid to be added to the feedstock for one or both of the two refiners.

It is also possible to operate the present invention when the refiner stage comprises a single refiner. With this form of manufacturing equipment liquid is added to the feedstock in the refiner hopper in pulses so that parts of the feedstock are mixed with the liquid for a period of time and these parts are separated from each other by untreated parts of the feedstock. Thus the detergent mass progressing through the refiner contains entrained liquid being mixed with the mass as it passes through the stage. These detergent masses alternate with detergent masses to which liquid has not been added or which have been mixed with a different liquid. In this aspect of the invention it is necessary to include a mixing stage between the refiner and plodder within which stage the two noodle feedstocks issuing from the refiner are retained and mixed before passing to the plodder.

It is probable the additive liquid, although miscible with the detergent feedstock, will not be completely admixed therewith during passage through the refiner. The resultant coloured noodles fed to the plodder in admixture with the other stream of noodles may therefore have non-homogeneous appearance with the colour non-uniformly distributed throughout the noodle. This non-homogeneous distribution can be utilised to provide resultant extrudates having striations which blend easily from one to the other. Thus there is not a sharp de-lineation between the striations on the product bar, but rather a gentle merging across the colours.

The present invention is particularly applicable to formulations wherein the detergent is formed completely or partly by soaps i.e., water soluble salts of long-chain ($C_8$–$C_{22}$) mono-carboxylic acids. Normally the sodium salt will be used but potassiun salts and other water soluble salts are usable in the invention. Non-soap detergents e.g., acyl isethionates, alkene sulphonates, alkane sulphonates and alkyl benzene sulphonates may also be used, preferably in admixture with soap as the major component.

LITERATURE

Italian No. 584,141 (MAZZONI) describes a mixed noodle process in which a part of the output from a refiner plodder is separated and admixed with a dye liquid before being returned to the main stream of soap noodles. In U.S. Pat. No. 4,141,947 (FISCHER) a soap feedstock is mixed with a colouring agent which is insoluble in the soap mass. The mixture is passed to a final plodder stage to provide a striated soap in which the striations are formed by the colouring agent. U.S. Pat. No. 3,769,225 (MATTHAEI) describes addition of a dye liquid to milled chips passed to the upper barrel of a two stage soap plodder with a heel of soap maintained between extrusion screw and pressure plate of the first barrel. UK No. 1,528,081 (PROCTER) described mixing two separate streams of the coloured noodles of specific size to form a marbled bar. UK No. 1,437,322 (PROCTER) describes mixing coloured liquid with detergent at apertured disc following the refiner stage of a single barrel assembly. In UK No. 1,316,477 (UNILEVER) liquid colourant is injected into the compressed detergent; the colourant flow may be intermittent.

COMPONENTS

The detergent base will usually, as has been described previously, contain a majority of water soluble salts of long-chain mono-carboxylic acids. These acids will normally be derived from triglyceride fats and oils eg, tallow, coconut, palm kernel and other oils of vegetable and animal origin. It may also be obtained from synthetic groups via synthetic long-chain alcohols or by oxidation of paraffinic feedstocks. The non-soap detergents utilised will normally be those obtained from synthetic or natural sources and will generally be those commercially available.

The additive liquid, which is visually distinct from the detergent feedstock, will usually comprise an aqueous base and a coloured material. Amounts of other additives e.g., glycerine or polyhydric materials e.g., polyethylene-glycol may be added in addition to opacifying agents e.g., titanium dioxide.

SPECIFIC DESCRIPTION OF INVENTION

The accompanying diagrammatic drawings illustrate apparatus which can be utilised in the process of the present invention.

FIG. 1 is a side exposed view of a refiner/final plodder arrangement;

FIG. 2 is a section along the line II—II of FIG. 1; and

FIG. 3 is a section along the line III—III of FIG. 1.

The refiner/plodder arrangement of FIG. 1 comprises a twin refiner 1 which supplies noodles to a twin plodder 3 via a vacuum chamber 2. Detergent chips placed in hopper 4, which includes partition 12, passes through the screws 10, 11 of refiner 1 and is formed into noodles at the multi-apertured refiner plate 5 by means of the rotating knives 6. A detergent miscible liquid is supplied to the detergent mass passed through extruder screw 11 by means of the conduit 13. Thus the liquid is added to part of the feedstock before the latter enters the refiner stage. The two streams of noodles, which can be visually distinguished, exiting through refiner plates 5 are mixed together by passage past deflector plates 14. These deflector plates function to mix the two streams of noodles so that the extruder screws 15, 16 of plodder 3 receive the same mixture of noodles. The noodle mixture passes down extruder screws 15, 16 and are inwardly compressed through cone 8. The detergent mass comprising the mixed noodle feedstock is extruded as two billets through appropriate apertures at the downstream smaller end of cone 8. The extrudates 9 are cut into appropriate sized billets and stamped to form bars. Optionally a multi-apertured plate 7 is included to modify the multicoloured appearance of the bar.

A refiner/plodder arrangement utilising a single refiner and single plodder would have the same side exposed view shown in FIG. 1. However, a detergent miscible liquid would be supplied to hopper 4 for admixture with the detergent chips fed to the refiner plodder 1 at that time. The liquid supplied to hopper 4 would be pulsed to provide the desired colouration of the detergent mass passing through the refiner and the mixing means incorporated within vacuum chamber 2 would be required to be sufficiently efficient to provide thorough mixing of the two feedstocks exiting the refiner plate 5 in sequence.

EXAMPLE

A soap base derived from tallow 80%/coconut 20% was given a pale green colour by addition of a mixture of Monastral Green and Monastral Blue pigments (0.012% by weight total) obtainable from ICI LIMITED of England (MONASTRAL is a Registered Trade Mark). Titanium dioxide (0.15% by eight) was included in the base. A colour slurry containing the green and blue pigments at a level of 17% and 3% by weight respectively in an aqueous base was added to the soap base on one side of the partition of the twin barrel refiner shown in FIG. 1 at a level of 1% to provide noodles with more intense colouration. The two streams of noodles were mixed before passing to the plodder. The product bar had striated appearance with light and dark green colouration.

What I claim is:

1. A method of manufacturing multi-coloured detergent bars wherein at least two stream of detergent noodles of different visual appearance are supplied to a detergent plodder and the extrudate is cut and stamped to form bars, characterised in that the streams of detergent noodles are generated from a single detergent feedstock by feeding a portion of said feedstock to each barrel of a parallel twin barrel refiner and by adding a visually distinct liquid, which is miscible with the feedstock, only to at least a part of the feedstock portion fed to one barrel of the twin barrel refiner at the point where said feedstock enters the refiner in which the streams are subjected to substantially equal working before passing to the plodder.

2. A method according to claim 1 wherein the additive liquid is not completely admixed with the detergent during passage through the refiner.

3. A method of manufacturing multi-coloured detergent bars wherein at least two streams of detergent noodles of different visual appearance are supplied to a detergent plodder and the extrudate is cut and stamped to form bars, characterised in that the streams of detergent noodles are generated from a single feedstock by adding a visually distinct liquid, which is miscible with the feedstock, to at least a part of the feedstock at the point where said feedstock enters a refiner in which the streams are subjected to substantially equal working before passing to the plodder, and wherein said refiner comprises a single barrel and liquid is added to the feedstock in pulses so that the parts of the feedstock mixed with liquid are separated in sequence by untreated parts.

* * * * *